(12) United States Patent
Chen et al.

(10) Patent No.: US 9,336,737 B2
(45) Date of Patent: May 10, 2016

(54) ARRAY SUBSTRATE, DISPLAY DEVICE AND CONTROL METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiaochuan Chen, Beijing (CN); Hailin Xue, Beijing (CN); Lei Wang, Beijing (CN); Yue Li, Beijing (CN); Fuqiang Li, Beijing (CN); Xuelu Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 47 days.

(21) Appl. No.: 14/347,815

(22) PCT Filed: Apr. 8, 2013

(86) PCT No.: PCT/CN2013/073896
§ 371 (c)(1),
(2) Date: Mar. 27, 2014

(87) PCT Pub. No.: WO2014/131223
PCT Pub. Date: Sep. 4, 2014

(65) Prior Publication Data
US 2015/0213774 A1 Jul. 30, 2015

(30) Foreign Application Priority Data
Feb. 28, 2013 (CN) .......................... 2013 1 0062579

(51) Int. Cl.
*G09G 3/36* (2006.01)
*G02F 1/1362* (2006.01)
*G02F 1/1368* (2006.01)

(52) U.S. Cl.
CPC ............ *G09G 3/3677* (2013.01); *G02F 1/1368* (2013.01); *G02F 1/13624* (2013.01); *G02F1/136286* (2013.01); *G09G 3/3659* (2013.01); *G09G 2300/0426* (2013.01); *G09G 2300/0814* (2013.01); *G09G 2310/021* (2013.01); *G09G 2310/0251* (2013.01); *G09G 2320/0219* (2013.01)

(58) Field of Classification Search
CPC .................... G09G 2300/0426; G09G 3/3607; G09G 3/3648
USPC ............................... 345/92, 212, 107; 349/48
See application file for complete search history.

(56) References Cited

U.S. PATENT DOCUMENTS

| | | | | |
|---|---|---|---|---|
| 8,427,596 B2 * | 4/2013 | Ma | ................................... | 349/48 |
| 2009/0295697 A1 * | 12/2009 | Su | ................................... | 345/92 |
| 2013/0009938 A1 * | 1/2013 | Hwang et al. | ................. | 345/212 |

FOREIGN PATENT DOCUMENTS

| | | | |
|---|---|---|---|
| CN | 101458429 A | 6/2009 | |
| CN | 102023426 A | 4/2011 | |

OTHER PUBLICATIONS

First Chinese Office Action dated Dec. 3, 2014; Appln. No. 201310062579.X.
International Search Report mailed Nov. 14, 2013; PCT/CN2013/073896.
International Preliminary Report on Patentability issued Sep. 1, 2015; PCT/C2013/073896.

* cited by examiner

*Primary Examiner* — Kumar Patel
*Assistant Examiner* — Kuo Woo
(74) *Attorney, Agent, or Firm* — Ladas & Parry LLP

(57) ABSTRACT

An array substrate, a display device and a control method thereof are disclosed. The array substrate includes a plurality of gate lines and a plurality of data lines which are intercrossed to define pixels arranged in an array. The gate lines include n gate line groups and n+1 main gate lines; each gate line group includes a first gate line and a second gate line which are adjacent to each other; the first gate line is provided corresponding to a first transistor, and the second gate line is provided corresponding to a second transistor and a switching element; both the first gate line and the second gate line in the $i^{th}$ gate line group are connected with the $i^{th}$ main gate line; a gate electrode of the first transistor is connected with the first gate line, a source electrode connected with a corresponding data line, a drain electrode connected with a pixel electrode; a gate electrode of the second transistor is connected with one end of the switching element in a pixel unit, a source electrode connected with a corresponding data line, a drain electrode connected with a pixel electrode; and the other end of the switching element is connected with a main gate line in the $(i+1)^{th}$ row and configured to control on/off operation of the second transistor.

8 Claims, 4 Drawing Sheets

ARRAY SUBSTRATE, DISPLAY DEVICE AND CONTROL METHOD THEREOF

TECHNICAL FIELD

Embodiments of the present invention relate to an array substrate, a display device and a control method thereof.

BACKGROUND

With the continuous development of display technology, liquid crystal displays (LCDs) have dominated the flat-panel display field. Pixels in an LCD are arranged in an array; each pixel is generally divided into three pixel units, namely red, green and blue (RGB) pixel units; and each pixel unit is cooperatively controlled by a gate line and a data line.

The number of gate lines in the LCD is equal to the number of pixel rows. For instance, in a common half-size video graphics array (HVGA) type LCD, the number of pixels is 480×320, and therefore 480 gate lines must be provided. The gate lines must be connected to a gate line driver from a side of a display area. In order to reduce the width of the gate lines, a double-side routing process is usually adopted, namely lines are provided on two sides of the display area; 240 gate lines are disposed on each side; and hence a frame width of 2.5 mm is needed for performing a wiring process.

An alternate routing process may be further provided on the basis of the double routing process, namely two sides of the display area are respectively configured in two layers for wiring, and hence the frame width can be reduced to about 1.7 mm. But in this way, because adjacent wirings have resistance difference therebetween, the defect of horizontal lines (H-line) will occur in the display process of the LCD, and hence the display effect can be disadvantageously affected.

SUMMARY

Embodiments of the present invention provide an array substrate, a display device and a control method thereof, which can solve the problem that the display effect is affected by H-lines in a narrow-frame LCD.

In one aspect, the present invention provides an array substrate, which comprises a plurality of gate lines and a plurality of data lines which are intercrossed to define pixels arranged in arrays; the plurality of gate lines include n gate line groups and n+1 main gate lines; each gate line group includes a first gate line and a second gate line which are adjacent to each other; the first gate line is provided corresponding to a first pixel group, and the second gate line is provided corresponding to a second pixel group; the first pixel group includes a plurality of first pixel units arranged in a row; each first pixel unit includes a first transistor; the second pixel group includes a plurality of second pixel units arranged in a row; the second pixel unit includes a second transistor and a switching element; both the first gate line and the second gate line in the $i^{th}$ gate line group are connected with the $i^{th}$ main gate line; a gate electrode of the first transistor in the first pixel unit corresponding to the first gate line in the $i^{th}$ gate line group is connected with the first gate line; a source electrode of the first transistor is connected with a corresponding data line; a drain electrode of the first transistor is connected with the pixel unit; a gate electrode of the second transistor in the second pixel unit corresponding to the second gate line in the $i^{th}$ gate line group is connected with one end of the switching element in the pixel unit; a source electrode of the second transistor is connected with a corresponding data line; a drain electrode of the second transistor is connected with a pixel electrode of the pixel unit; and another end of the switching element in the second pixel unit corresponding to the second gate line in the $i^{th}$ gate line group is connected with a main gate line in the $(i+1)^{th}$ row or any gate line in the $(i+1)^{th}$ gate line group and configured to control on/off operation of the second transistor in the second pixel unit in the $i^{th}$ gate line group, in which both i and n are integers, and $1 \le i \le n$.

For instance, the switching element is a thin-film transistor (TFT); a gate electrode of the TFT is connected with the second gate line of the $i^{th}$ gate line group; a source electrode of the TFT is connected with the main gate line in the $(i+1)^{th}$ row or any gate line in the $(i+1)^{th}$ gate line group; and a drain electrode of the TFT is connected with the gate electrode of the second transistor in the pixel unit in which the TFT is disposed.

Moreover, for instance, the TFT is an N-type TFT.

For instance, the $(n+1)^{th}$ main gate line is connected with or merged to the first main gate line.

In another aspect, the present invention provides a display device, which comprises the foregoing array substrate. The gate lines in the array substrate respectively control the rows of pixel units in the display device.

In still another aspect, the present invention provides a control method of the display device: in a scanning process of the $i^{th}$ main gate line, in a first time period, the $i^{th}$ main gate line and the $(i+1)^{th}$ main gate line are at a high level, and meanwhile data signals of the second pixel group corresponding to the second gate line in the $i^{th}$ gate line group are outputted by the data lines in the display device; and in a second time period, the $i^{th}$ main gate line is at a high level, and meanwhile data signals of the first pixel group corresponding to the first gate line in the $i^{th}$ gate line group are outputted by the data lines in the display device, in which both i and n are integers, and $1 \le i \le n$.

The array substrate provided in the embodiment of the present invention comprises n gate line groups, wherein each gate line group includes two adjacent gate lines, namely 2n gate lines are provided in total; but only n+1 main gate lines are required to be disposed on a side of a display area, so that the number of routings on the side of the display area is almost a half of the total amount of the gate lines; and hence the frame width of the LCD can be reduced and the poor display effect of H-lines cannot occur.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise defined, the technical or scientific terms used herein have normal meanings understood by those skilled in the art. The words "first", "second" and the like used in the description and the claims of the patent application of the present invention do not indicate sequence, amount or importance but are only used for distinguishing different components. Similarly, the words "a", "an", "the" and the like also do not indicate the amount but only indicate at least one. The word "comprise", "include" or the like only indicates that an element or a component before the word contains elements or components listed after the word and equivalents thereof, not excluding other elements or components. The words "coupled", "connected" and the like are not limited to physical or mechanical connection but may include electrical connection, either directly or indirectly. The words "on", "under", "left", "right" and the like only indicate the relative position relationship which is correspondingly changed when the absolute position of a described object is changed.

Embodiment 1

Figure 1:
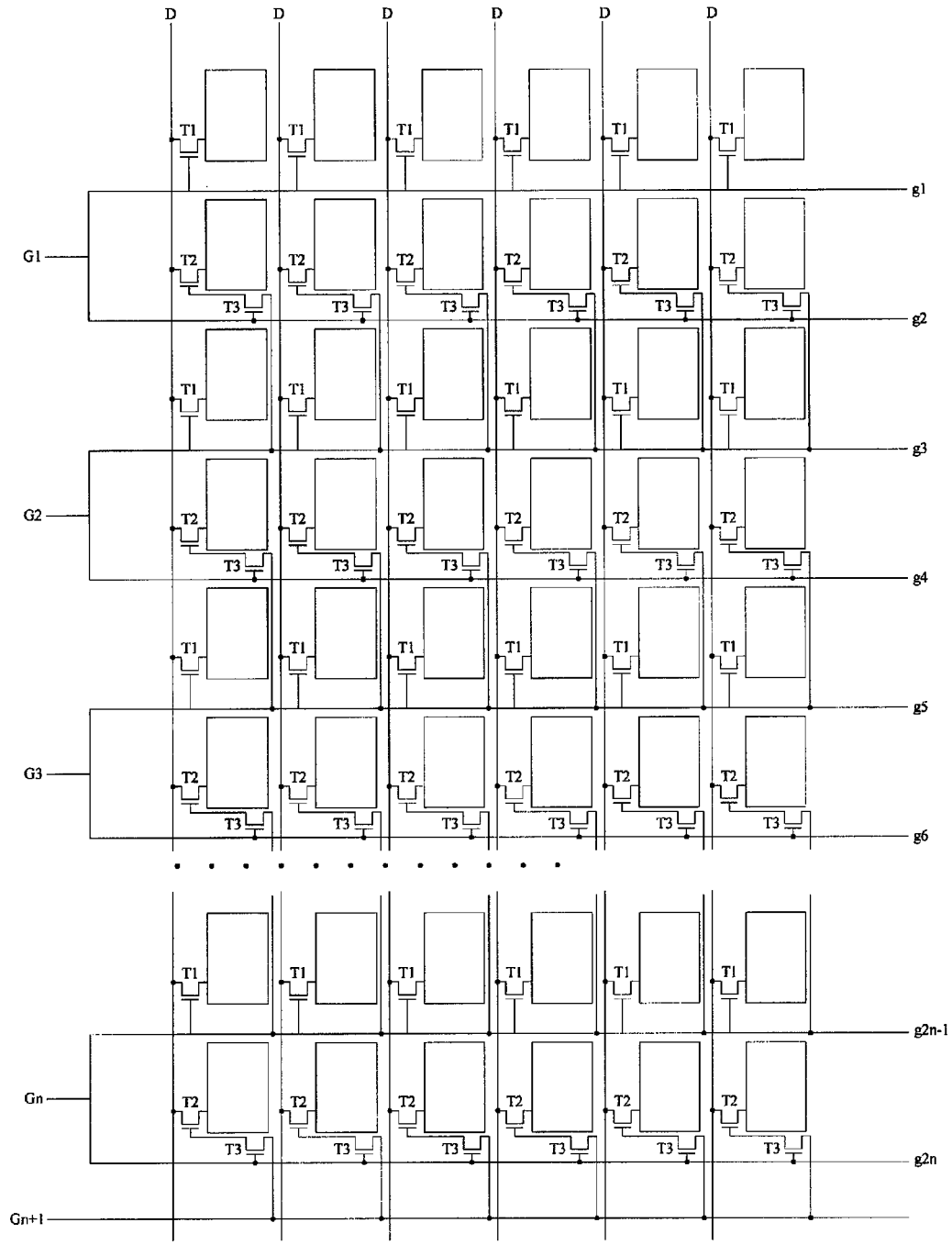
FIG. 1 is a schematic diagram of an array substrate provided by a first embodiment of the present invention.

As illustrated in FIG. 1, the array substrate provided in the embodiment of the present invention may be applied in an LCD. The array substrate comprises a plurality of gate lines and a plurality of data lines D; the plurality of gate lines include n gate line groups and n+1 main gate lines G1 to Gn+1; the gate lines and the data lines are intercrossed each other to define a plurality of pixels arranged in an array; each main gate line is connected to a gate line driver of the LCD; each gate line group includes a first gate line and a second gate line which are adjacent to each other; the first gate line is provided corresponding to a first pixel group; the second gate line is provided corresponding to a second pixel group; the first pixel group includes a plurality of first pixel units arranged in a row; each first pixel unit includes a first transistor T1 which is connected to a pixel electrode of the first pixel unit and controls whether to charge the pixel electrode; the second pixel group includes a plurality of second pixel units arranged in a row; the second pixel unit includes a second transistor T2 and a switching element T3; and the transistor T2 is connected to a pixel electrode of the second pixel unit and controls whether to charge the pixel electrode. As illustrated in FIG. 1, two adjacent pixel units in each column of the pixel units of the LCD are correspondingly provided with the transistors T1, T2 and a switching element T3 and each connected with the data line D corresponding to the pixel column respectively.

Both the first gate line and the second gate line in the $i^{th}$ gate line group are connected with the $i^{th}$ main gate line Gi. The first gate line and the second gate line in the first gate line group are respectively the first row of gate line g1 and the second row of gate line g2 in the LCD; the first gate line and the second gate line in the second gate line group are respectively the third row of gate line g3 and the fourth row of gate line g4 in the LCD, and so on. If the array substrate comprises n gate line groups, the LCD comprises 2n rows of gate lines.

In the first pixel unit corresponding to the first gate line in the $i^{th}$ gate line group, a gate electrode of the transistor T1 is connected with the first gate line; a source electrode of the T1 is connected with a corresponding data line D; and a drain electrode of the T1 is connected with a corresponding pixel electrode (a square portion in the figure).

In the second pixel unit corresponding to the second gate line in the $i^{th}$ gate line group, a gate electrode of the transistor T2 is connected with one end of the switching element T3 in the pixel unit; a source electrode of the T2 is connected with a corresponding data line D; and a drain electrode of the T2 is connected with a pixel electrode of the pixel unit.

In the second pixel unit corresponding to the second gate line in the $i^{th}$ gate line group, one end of the switching element T3 is connected with $(i+1)^{th}$ main gate line or any gate line in the $(i+1)^{th}$ gate line group, and another end is connected with the gate electrode of the transistor T2 and configured to control the on/off operation of the T2 in the second pixel unit of the $i^{th}$ gate line group.

For instance, the switching element T3 is a TFT and is preferably an N-type TFT. The connection mode of the switching element T3 is, for instance, as follows: a gate electrode of the element T3 is connected with the second gate line in the $i^{th}$ gate line group; a drain electrode of the element T3 is connected with the gate electrode of the transistor T2 in the pixel unit in which the element T3 is disposed; and a source electrode of the T3 is connected with a main gate line in the $(i+1)^{th}$ row or any gate line in the $(i+1)^{th}$ gate line group. For instance, when i=n, the source electrode of the element T3 is connected with the $(i+1)^{th}$ main gate line (namely the $(n+1)^{th}$ main gate line); and when 1≤i≤n−1, the source electrode of the element T3 is connected with the first gate line or the second gate line in the $(i+1)^{th}$ gate line group. In this way, if the gate electrode of the transistor T2 in the $i^{th}$ gate line group is required to be at a high level, the drain electrode of the element T3 in the $i^{th}$ gate line group must be at a high level, namely the main gate lines Gi and Gi+1 must be at a high level at the same time.

In another implementation, the source electrode of the element T3 may be connected with the second gate line in the $i^{th}$ gate line group and the gate electrode of the element T3 may be connected with the main gate line in the $(i+1)^{th}$ row or any gate line in the $(i+1)^{th}$ gate line group, as long as the gate electrode of the transistor T2 in the $i^{th}$ gate line group is at a high level when the main gate line Gi and Gi+1 are at a high level at the same time.

An embodiment of the present invention further provides a display device employing an LCD. The LCD comprises the array substrate provided in the embodiment of the present invention; and various gate lines in the array substrate respectively control various rows of pixel units in the LCD. The LCD, for instance, comprises an opposing substrate (e.g., a color filter substrate). The opposing substrate and the array substrate are arranged opposite to each other to form a liquid crystal cell filled with liquid crystal materials. The LCD, for instance, may further comprise a light source, e.g., a backlight.

An embodiment of the present invention further provides a control method of the display device. The control method is, for instance, as follows.

In the scanning process of the $i^{th}$ main gate line, in the first time period, the $i^{th}$ main gate line and the $(i+1)^{th}$ main gate line are at a high level. At this point, one end of the switching element in the second pixel unit corresponding to the second gate line in the $i^{th}$ gate line group, which end is connected with the main gate line in the $(i+1)^{th}$ row (or any gate line in the $(i+1)^{th}$ gate line group), is at a high level, so that the gate electrode of the second transistor in the second pixel unit is at a high level, namely the second transistor is switched on under the control of the switching element. At this point, data signals of the second pixel group corresponding to the second gate line in the $i^{th}$ gate line group can be outputted by the data lines to charge pixel electrodes of the pixel units in the row.

In the second time period, only the $i^{th}$ main gate line is at a high level, and thus the gate electrode of the first transistor in the $i^{th}$ gate line group is at a high level. At this point, data signals of the first pixel group corresponding to the first gate line in the $i^{th}$ gate line group are outputted by data lines to charge the pixel electrodes of the pixel units in the row.

The display control of the display device can be achieved with the above method by the recurrence of i increased from 1 to n. The specific examples in the scanning process will be described below with reference to the accompanying drawings.

Figure 2:
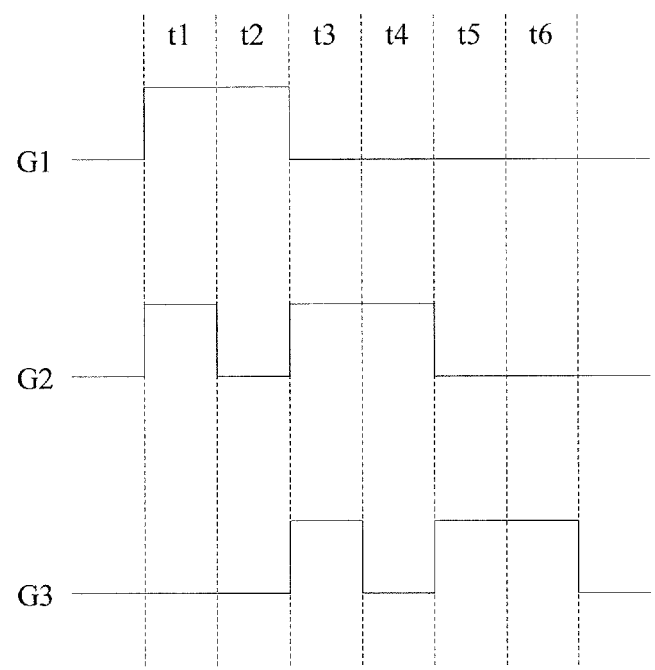
FIG. 2 is a timing chart of a control method provided in the first embodiment of the present invention.

As illustrated in FIG. 2, in the scanning process of the $i^{th}$ main gate line, in the first time period t1, the $i^{th}$ main gate line Gi and the $(i+1)^{th}$ main gate line Gi+1 are at a high level. When i=1, namely the main gate lines G1 and G2 are at a high level, at this point, both the gate electrodes and the source electrodes of the switching elements T3 in the first gate line group are at a high level, so that the drain electrodes of the elements T3 are also at a high level, and hence the gate electrodes of the transistors T2 in the first gate line group are at a high level, namely the transistors T2 are switched on under the control of the switching elements; and meanwhile the data signals of the second pixel group corresponding to the second gate line (namely the second row of pixel units corresponding to g2) in the first gate line group are outputted by the data lines D to charge the pixel electrodes in the second row of pixel units.

Of course, at this point, the gate electrodes of the transistors T1 in the first gate line group and the gate electrodes of the transistors T1 in the second gate line group are also at a high level, and hence the first row of pixel units and the third row of pixel units are also charged with the same data signals as those for the second row of pixel units. However, the first row of pixel units will be recharged with correct data signals in the subsequent second time period t2; and similarly, the third row of pixel units will be recharged with correct data signals in the subsequent fourth time period t4. Therefore, the final display effect of the first row of pixels and the third row of pixels will not be affected.

In the second time period t2, only the main gate line G1 is at a high level, and hence the gate electrodes of the transistors T1 in the first gate line group are at a high level; and meanwhile the data signals of the first pixel group corresponding to the first gate line (namely the first row of pixel units corresponding to g1) in the first gate line group are outputted by the data lines D to charge the pixel electrodes in the first row of pixel units.

In the third time period t3 (equivalent to another first time period when i=2), the main gate lines G2 and G3 are at a high level, at this point, both the gate electrodes and the source electrodes of the switching elements T3 in the second gate line group are at a high level, so that the drain electrodes of the switching elements T3 are also at a high level, and hence the gate electrodes of the transistors T2 in the second gate line group are at a high level; and meanwhile data signals of the second pixel group corresponding to the second gate line (namely the fourth row of pixel units corresponding to g4) in the second gate line group are outputted by the data lines D to charge the pixel electrodes in the fourth row of pixel units.

In the fourth time period t4 (equivalent to another second time period when i=2), only the main gate line G2 is at a high level, and hence the gate electrodes of the transistors T1 in the second gate line group are at a high level; and meanwhile the data signals of the first pixel group corresponding to the first gate line (namely the third row of pixel units corresponding to g3) in the second gate line group are outputted by the data lines D to charge pixel electrodes in the third row of pixel units.

The display control of the display device can be achieved with the above method by the recurrence of i from 1 to n.

The array substrate provided in the embodiment of the present invention comprises n gate line groups and each gate line group comprises two adjacent gate lines, namely the display device comprises 2n gate lines in total and can be controlled by the control method also provided in the embodiment of the present invention. In this way, only n+1 main gate lines are required to be disposed on one side of the display area, and hence the number of routings on the side of the display area is almost a half of the total amount of the gate lines, and consequently the frame width of the LCD can be reduced. For instance, as for an HVGA type LCD, 480 gate lines are disposed in a gate electrode drive circuit on an array substrate of the LCD (n=240); only 241 main gate lines are required to be disposed on the side of a display area; with double routing, 120 main gate lines are required to be disposed on one side of the display area and 121 main gate lines are required to be disposed on the other side, and therefore the frame width can be reduced to be 1.7 mm or so. Moreover, the defect of H-lines caused by the alternate routing in the prior art can be overcome.

Moreover, if the defect of the H-lines is ignored, the technical proposal provided in the embodiment of the present invention may also adopt the alternate routing described in the prior art to arrange the gate lines and the gate electrode driver. In this case, the frame width can be further reduced to be less than 1.2 mm.

It should be noted that: in the embodiment of the present invention, as illustrated in FIG. 1, the preceding gate line in each gate line group is defined to be the first gate line and the subsequent gate line is defined to be the second gate line, but the embodiment of the present invention is not limited thereto and the positions of the first gate line and the second gate line in the gate line group are changeable. In that way, for instance, exchange is performed based on the situation as shown in FIG. 1, in the first gate line group, the first gate line becomes the second row of gate line g2 in the LCD while the second gate line becomes the first row of gate line g1 in the LCD. Also, in the second gate line group, the first gate line becomes the fourth row of gate line g4 in the LCD while the second gate line becomes the third row of gate line g3 in the LCD. In this way, the driving process can be achieved in the sequence of the gate lines g1, g2, g3 . . . g2n in the display control process, so that the pixel electrodes in the rows of pixel units can be charged in normal sequence.

Embodiment 2

Figure 3:
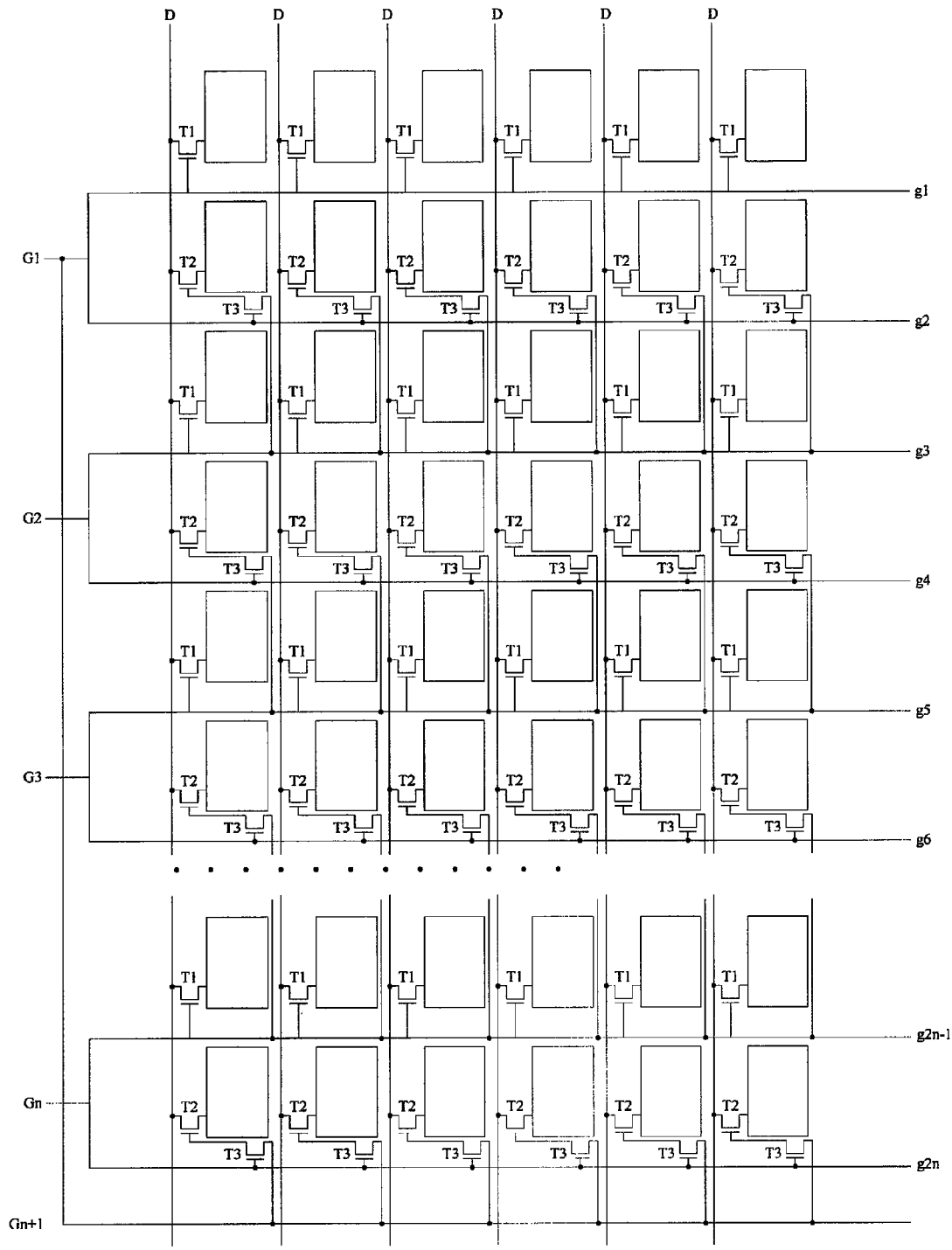
FIG. 3 is a schematic diagram of an array substrate provided by a second embodiment of the present invention.
Figure 4:
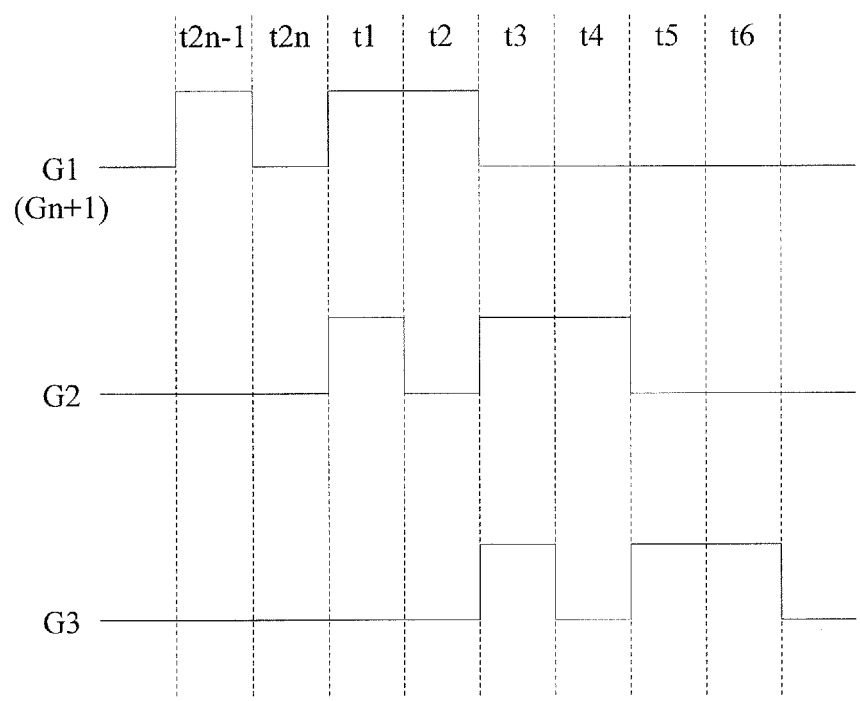
FIG. 4 is a timing chart of a control method provided in the second embodiment of the present invention.

The array substrate of the embodiment is basically the same as that of the embodiment 1, with the difference as follows: as illustrated in FIG. 3, in the embodiment, the n+1 main gate line is connected with the first main gate line G1. In this way, the main gate lines Gn+1 and G1 can be controlled together. The timing chart of the main gate line G1 (also Gn+1) may be as shown in FIG. 4. In two time periods prior to the first time period t1 in the embodiment 1, namely in the time period t2n−1 and t2n of the last scanning process, the main gate line G1 is cooperative with the main gate line Gn, so that pixel electrodes in the 2n−1 row of pixel units and the 2n row of pixel units can be charged.

Embodiment 3

The array substrate of the embodiment is basically the same as that of the embodiment 1, with the difference as follows: in the embodiment, the $(n+1)^{th}$ main gate line Gn+1 is merged to the first main gate line G1, namely the main gate lines Gn+1 and G1 are combined into one main gate line indicated as G1, and hence the gate electrodes (or the source electrodes) of the switching elements T3 in the $n^{th}$ gate line group are still connected with the second gate line in the $n^{th}$ gate line group but the source electrodes (or the gate electrodes) of the switching elements T3 in the $n^{th}$ gate line group should be connected to the main gate line G1, for instance, may be connected to the first gate line or the second gate line in the first gate line group. At this point, the timing chart of the main gate line G1 (namely Gn+1) may be still as shown in FIG. 4.

The control method in the embodiment 2 may also be applied here. In addition, one main gate line may be further reduced. For instance, in the HVGA type LCD, only 120 main gate lines are required to be disposed on both sides of the display area respectively, and hence the routing symmetry on both sides of the display area can be improved.

The foregoing is only the preferred embodiments of the present invention and not intended to limit the scope of protection of the present invention. The scope of protection of the present invention should be defined by the appended claims.

The invention claimed is:

1. An array substrate, comprising a plurality of gate lines and a plurality of data lines which are intercrossed to define pixels arranged in an array,
wherein the plurality of gate lines include n gate line groups and n+1 main gate lines, the n gate line groups include gate line groups form a $1^{st}$ gate line group to an $n^{th}$ gate line group, the n+1 main gate lines include main gate lines form a $1^{st}$ main gate line to an $(n+1)^{th}$ main gate line, and n is an integer; each gate line group includes a first gate line and a second gate line which are adjacent to each other; the first gate line is provided corresponding to a first pixel group, and the second gate line is provided corresponding to a second pixel group; the first pixel group includes a plurality of first pixel units arranged in a row; each first pixel unit includes a first transistor; the second pixel group includes a plurality of second pixel units arranged in a row; the second pixel unit includes a second transistor and a switching element;
for each integer i that satisfies 1≤i≤n:
both the first gate line and the second gate line in an $i^{th}$ gate line group are connected with an $i^{th}$ main gate line;
in the first pixel unit corresponding to the first gate line in the $i^{th}$ gate line group, a gate electrode of the first transistor is connected with the first gate line; a source electrode of the first transistor is connected with a corresponding data line; a drain electrode of the first transistor is connected with the pixel unit;
in the second pixel unit corresponding to the second gate line in the $i^{th}$ gate line group, a gate electrode of the second transistor is connected with one end of the switching element in the pixel unit; a source electrode of the second transistor is connected with a corresponding data line; a drain electrode of the second transistor is connected with a pixel electrode of the pixel unit; and
in the second pixel unit corresponding to the second gate line in the $i^{th}$ gate line group, another end of the switching element is connected with a main gate line in an $(i+1)^{th}$ row or any gate line in an $(i+1)^{th}$ gate line group and configured to control on/off operation of the second transistor in the second pixel unit in the $i^{th}$ gate line group.

2. The array substrate according to claim 1, wherein the switching element is a thin-film transistor (TFT); a gate electrode of the TFT is connected with the second gate line of the $i^{th}$ gate line group; a source electrode of the TFT is connected with the main gate line in the $(i+1)^{th}$ row or any gate line in the $(i+1)^{th}$ gate line group; and a drain electrode of the TFT is connected with the gate electrode of the second transistor in the pixel unit in which the TFT is disposed.

3. The array substrate according to claim 2, wherein the TFT is an N-type TFT.

4. The array substrate according to claim 1, wherein the $(n+1)^{th}$ main gate line is connected with or merged to the $1^{st}$ main gate line.

5. A display device, comprising the array substrate according to claim 1, wherein the gate lines in the array substrate respectively control the rows of pixel units in the display device.

6. A control method, which is applied to the display device according to claim 5, wherein in a scanning process of the $i^{th}$ main gate line,
outputting, by the data lines in the display device, data signals of the second pixel group corresponding to the second gate line in the $i^{th}$ gate line group, when, in a first time period, the $i^{th}$ main gate line and the $(i+1)^{th}$ main gate line are at a high level; and
outputting, by the data lines in the display device, data signals of the first pixel group corresponding to the first gate line in the $i^{th}$ gate line group, when, in a second time period, the $i^{th}$ main gate line is at a high level, in which both i and n are integers, and 1≤i≤n.

7. The array substrate according to claim 2, wherein the $(n+1)^{th}$ main gate line is connected with or merged to the $1^{st}$ main gate line.

8. The array substrate according to claim 3, wherein the $(n+1)^{th}$ main gate line is connected with or merged to the $1^{st}$ main gate line.

* * * * *